3,275,250
PROCESS FOR MAKING FINE PARTICLES
OF NITROCELLULOSE
Mark Plunguian, Newark, Del., assignor to Hercules
Incorporated, a corporation of Delaware
No Drawing. Filed Oct. 14, 1963, Ser. No. 316,122
5 Claims. (Cl. 241—21)

The present invention relates to an improved procedure for formation of finely divided particles of nitrocellulose.

For many year, nitrocellulose has found considerable use as the film-forming component of protective and decorative coatings, inks, adhesives and the like. The common method has been to apply the nitrocellulose in solution form and allow the film to be formed by evaporation of the active solvent. The use of a solvent is an item of considerable expense, and it has long been the desire of the art to develop a means whereby nitrocellulose films can be applied from less costly media.

One approach to this problem is to apply the nitrocellulose to the workpiece in the form of a dispersion of finely divided particles in a non-solvent such as water together with modifying resins, plasticizers, pigments and other components. After application and evaporation of the water, the workpiece is treated to coalesce the nitrocellulose and other components into a continuous film as, for instance, by application of heat or application of a solvent type nitrocellulose plasticizer. A major drawback to using this approach has been the difficulty encountered in producing the finely divided nitrocellulose particles required for the dispersion, such particles desirably being no greater than about 5 microns in at least two dimensions and no greater than about 15 microns in any dimension.

It has been proposed to prepare finely divided nitrocellulose particles by spray drying a solution of the nitrocellulose. This results in a heterogeneous mixture of solid particles, hollow spheroids, and fine threads, the average particle size of which is from 15 to 30 microns, with maximum sizes ranging to as much as 180 microns. Such a product, when dispersed in water or an organic diluent, produces a wet pasty mass devoid of satisfactory flow properties, from which smooth homogeneous coatings cannot be prepared. An additional disadvantage is the relatively large amount of nitrocellulose solvent required to prepare the solution for spray drying which must be recovered or lost.

It has also been proposed to prepare nitrocellulose in finely divided form by frictionally grinding water-wet nitrocellulose between differentially rotating grinding plates or discs, as in a colloid mill, or between the rolls of a differential two-roll mill. Heretofore, however, such frictional grinding has always resulted in a heterogeneous product of relatively large particle size which forms only wet pasty masses devoid of satisfactory smoothness and flow characteristics when dispersed in a non-solvent medium, and entirely unsuitable for the preparation of satisfactory dispersion type coating compositions.

It has also been proposed to prepare finely divided nitrocellulose particles by dissolving the nitrocellulose in suitable water-insoluable volatile solvent mixtures and then forming an emulsion or dispersion of droplets of the resulting nitrocellulose solution in water, after which the solvent is removed by various means such as spray drying, emulsion boil-off, flash evaporation, spraying into a steam atmosphere, etc., to precipitate the nitrocellulose in fine particle form. Although use of such lacquer-in-water emulsions or suspensions generally produces uniform particles, both with respect to size of particle and particle configuration, the process is disadvantageous in requiring the use of solvent, some of which often remains in the nitrocellulose particles.

In other recent work, nitocellulose particles of extremely small size have been prepared by ball milling a water or organic non-solvent slurry of fibrous nitrocellulose in the presence of steel balls, corundum pebbles, and the like grinding media. Depending upon the size and nature of the grinding medium employed, ball milling is quite effective in producing small particles. When using ¾ inch corundum pebbles, for instance, fibrous nitrocellulose in water slurry can be reduced in size by about 48 hours of milling to the extent that better than 95% of the particles are less than one micron in size and substantially all fragments are smaller than two microns in at least two dimensions. Such particles are well suited to the production of hydrosols and organosols to be used in coating compositions. However, the length of time required to effect this desirable particle size reduction is undesirably long and contributes significantly to the expense of preparing such particles.

Slightly larger size particles, but still in the micron size range, are produced by ball milling the same nitrocellulose slurry with steel balls for an extended period of time. For example, using balls ¼ and ⅜ inch in diameter, it is possible to reduce the fibrous nitrocellulose to particles of 3-5 microns in at least two dimensions and no greater than about 15 microns in the third by milling for approximately 15-20 hours. Increasing the time of milling has little or no further effect on particle size, indicating that the 3-5 micron particle is the minimum size obtainable with ¼ and ⅜ inch steel balls. These particles are also well suited to the production of hydrosols and organosols for use in coating compositions. But, here again, the method would be made more atrractive if the time required to effect the size reduction were shortened.

A study of the process of comminuting the slurried nitrocellulose by means of ball milling has revealed that the process takes place in two distinct stages. In the first stage, the relatively large particles of fibrous nitrocellulose are fractured into smaller particles, but these particles immediately coalesce and agglomerate into irregularly shaped agglomerates. This first stage takes place relatively quickly, i.e., within a few hours after commencement of milling. When the corundum pebbles or the relatively small diameter steel or ceramic balls are employed as the grinding medium, continued milling for sufficient time results in a second stage comminution of these agglomerates to the desired particle size. However, when substantially larger balls are employed, it is found that the second stage comminution to break up the agglomerates does not take place. For instance, when the slurry is milled with one inch steel balls, the nitrocellulose fibers are reduced after only about four hours of milling to loosely bound, irregularly shaped agglomerates of about 40-200 microns in diameter. Further milling is ineffective to produce further particle size reduction.

It is, therefore, a purpose of this invention to provide a process of preparing finely divided nitrocellulose particles, which process forms particles at least as small as those formed by known ball milling processes in greatly reduced milling time.

The process according to the instant invention comprises a two-stage process of reducing fibrous nitrocellulose to particles no greater than about 5 microns in at least two dimensions and no greater than 15 microns in any dimension, which process comprises subjecting a slurry of the nitrocellulose fibers in a nitrocellulose non-solvent medium to high impact milling for a time sufficient to reduce the fibers to the form of irregularly shaped agglomerates of about 40 to 200 microns in diameter and thereafter subjecting these agglomerates in the same liquid medium to light dispersing action in the presence of a finely divided comminuting agent such as sand. In a preferred embodiment of the invention, the fibrous nitrocellulose is first milled in water or alcohol slurry in a ball mill containing steel balls at least about 3/16 inch in diameter, and the resulting slurry is thereafter agitated with 20–30 mesh silica for a time sufficient to effect substantially complete reduction to the specified fine particles.

In the first step of the process according to the invention, fibrous nitrocellulose, in either water or organic non-solvent slurry, is ball milled in a conventional rotating or stirred ball mill containing steel, ceramic, flint or other balls or pebbles at least 3/16 inch in diameter. As disclosed previously, this treatment, after several hours of milling, reduces the fibrous nitrocellulose to irregularly shaped agglomerates of 40–200 microns in diameter.

Why the fibrous nitrocellulose is reduced to this agglomerated form is not known for certain. However, it is postulated that when the nitrocellulose particles are fractured by the action of the ball mill, the heat generated at the point of impact causes softening of the surface of the particle. These softened particles then coalesce to form the relatively large diameter agglomerates.

When smaller grinding media are employed, these agglomerates are readily broken down upon longer milling to form the desired small particles. Apparently, once the original strong bonds of the crystalline nitrocellulose fibers have been broken down, the force exerted by the smaller pebbles in breaking down the relatively loosely bound agglomerates is not great enough to generate sufficient heat at the point of impact to cause reagglomeration.

However, when larger grinding media are used, even after the original fibrous structure has been broken down, the force exterted at the point of impact is still great enough to generate a considerable amount of heat, thus even though only the relatively loosely bound agglomerates are being acted upon, the heat to cause reagglomeration is still generated and the particles reagglomerate at virtually the same rate as that at which they are broken down. The net result is that continued milling results in no further significant decrease in particle size.

It is reasoned that the use of the ball mill or other high impact grinding means is necessary in the first step of the invention since the cohesive forces bonding the fibrous nitrocellulose are quite strong and not easily ruptured mechanically. However, the forces by which the agglomerated particles are bound are considerably weaker than those binding the original fibrous particles. Thus it is possible to rupture these bonds by less vigorous means which would be totally inadequate to grind the original fibrous particles. When such less vigorous means, expending considerably less energy, are employed, the amount of heat generated is not sufficient to soften the surfaces of the particles and cause fusion and agglomeration of the particles.

Therefore, in the second step of the invention, the agglomerated particles from the ball mill may be subjected to light grinding and dispersing action by simply agitating the slurry from the ball mill in the presence of fine sand. This relatively mild treatment is sufficient to break down the loosely bound agglomerates without generating sufficient heat at the point of impact to cause reagglomeration. The action of the sand milling is surprisingly rapid, only 1–5 minutes being required to effect complete reduction of the agglomerates to fine particles substantially all of which are less than 15 microns in their maximum dimension, in most cases less than 5 microns in the maximum dimension. Thereafter, the fine nitrocellulose particles are easily separated from the sand by screening.

The invention is illustrated by the following examples in which parts are parts by weight unless otherwise specified.

*Example 1*

Fourteen and seven-tenths parts, dry basis, of cubed nitrocellulose (5–6 sec. viscosity) was slurried with 42.8 parts water and ball-milled in a rotating mill with 557 parts of one inch diameter steel balls at 44 r.p.m. "Cubed" nitrocellulose is a form of fibrous nitrocellulose in which a plurality of such fibers are loosely agglomerated and cut into small, roughly cube-shaped particles. After four hours of milling, the fibrous structure had disappeared. The nitrocellulose was at this point in the form of platelets of about 1 to 3 microns thickness with the largest diameter about 150 microns. After a further two hours of milling, the 1 to 3 micron platelets were in the range of about 40 to 75 microns in diameter. An additional twelve hours of milling produced essentially no change in the size of these platelets.

The nitrocellulose platelets after six hours of milling, were slurried with 28.0 parts water and 112 parts of 20–30 mesh Ottawa sand. Ottawa sand is nearly pure silica (99.9% $SiO_2$) and of closely graded grain size. This slurry was charged to a vertical shaft mixer and agitated at 620 r.p.m. After one minute of batch mixing, the nitrocellulose particles were separated from the sand by screening. Fine particles with a maximum dimension of about two microns were produced.

*Example 2*

Four hundred parts, dry basis, of pulped nitrocellulose (5–6 sec. viscosity) fibers was slurried with 1,600 parts water and charged to a stirred ball mill with 40 parts of 3/8 inch diameter steel balls. The mill was run at 245 r.p.m. for three hours. This produced nitrocellulose platelets of 1 to 3 microns thickness with a range in diameters up to about 200 microns.

The nitrocellulose platelets were mixed with 1600 parts water and 2400 parts Ottawa sand, 20–30 mesh. This was agitated vigorously in a vertical shaft mixer for five minutes. This action gave mostly particles no larger than 1 to 3 microns in any dimension with a minor percentage of fibrils of up to about 2 by 5 microns.

*Example 3*

One hundred and fifty parts of nitrocellulose, beaten to pulpy fiber fractions of up to about 800 microns in length was slurried with 280 parts of water and 1120 parts of 20–30 mesh Ottawa sand. This slurry was charged to a vertical shaft mixer and agitated. Two hundred minutes of grinding produced essentially no breakdown of particle size.

The sand milling is ineffective by itself to effect any particle size reduction in nitrocellulose which has not been milled under conditions to form the previously discussed agglomerates. The energy required to break down the fiber structure is greater than is available from sand milling.

*Example 4*

Fifty-seven parts, dry basis, of cubed nitrocellulose (5–6 sec. viscosity) was slurried with 380 parts water. This slurry was ball milled with one inch steel balls at 44 r.p.m. for four hours. The nitrocellulose was thus reduced to the form of platelets of about 75 microns in diameter.

The resulting slurry of platelets was pumped through a sand grinder charged with 20–30 mesh silica particles, at a rate of one and one-half hours per gallon of slurry. The discharge from the sand mill consisted predominantly of particles of no larger than about 2 microns with a small proportion of fibrils of up to about 2 by 10 microns. The fine particles were readily separated from the sand by screening.

Example 5

Forty parts, dry basis, of pulped nitrocellulose (8 sec. viscosity) was slurried with 160 parts water and was ball milled in a paddle stirred ball mill with 3/16 inch steel balls for four hours at 244 r.p.m. This gave a wide range of particle sizes from small particles no larger than about 2 microns in any dimension to irregularly shaped agglomerates having diameters as great as 150 microns.

The slurry of platelets was then pumped through the sand grinder used in Example 4 at a rate of about one and one-half hours per gallon of slurry. The discharge from the sand mill contained predominantly fine particles no larger than about two microns with some fibrils of up to about 2 by 10 microns. The fine particles were readily separated from the sand by screening.

Both the ball milling and the sand milling can be conducted in either aqueous or organic medium. The organic medium must, of course, be one in which the nitrocellulose is substantially insoluble and in which it does not swell to any significant extent at ordinary temperatures. Preferred examples of such media are the aliphatic straight chain alcohols such as ethanol, n-propanol, n-butanol and the like. Also useful as the organic nonsolvent medium are the liquid aliphatic hydrocarbons, either saturated or unsaturated, liquid aromatic hydrocarbons such as toluene or benzene, and petroleum fractions.

Dispersions prepared from the finely dispersed nitrocellulose particles produced by the process of this invention are useful in all those applications wherein nitrocellulose is desired to be applied to a workpiece in the form of finely divided particles. A particularly useful example of such a use is in the application of heat seal coatings to paper or other substrata. After application of the dispersion to the workpiece, evaporation of the dispersing medium leaves a coating of discrete particles of nitrocellulose and plasticizer which coalesce into a film upon application of heat to the area to be sealed.

In a typical method of forming a hydrosol coating composition using the finely divided nitrocellulose particles of this invention, the sand, water, nitrocellulose slurry is removed from the sand mill and passed through a screen of a proper size to separate the sand from the nitrocellulose particles, leaving a dispersion of fine nitrocellulose particles in water. The water dispersion is concentrated by draining off excess water on a vacuum filter to produce a stiff, moist, nonflowable cake of the finely divided particles. This stiff, moist filter cake is then thoroughly blended with 2% by weight (based on dry nitrocellulose) of powdered methyl cellulose, thereby producing a smooth, homogeneous fluid dispersion of nitrocellulose in water, containing about 40% solids in which the nitrocellulose particles remain suspended almost indefinitely. The smooth flowing liquid dispersion is then modified by addition of dispersions or emulsions of appropriate resins, plasticizers, pigments, and other additives and additional water to form the desired composition.

Other uses for the finely divided nitrocellulose particles include propellant binders, wood fillers, pigment binders, barrier coatings and spraying compositions.

What I claim and desire to protect by Letters Patent is:

1. A two-stage process for reducing fibrous nitrocellulose to particles no greater than about 5 microns in at least two dimensions and no greater than about 15 microns in any dimension which process comprises subjecting a slurry of the said fibers in a nitrocellulose nonsolvent medium to high impact milling for a time sufficient to reduce the fibers to the form of irregularly shaped agglomerates of about 40 to 200 microns in diameter and thereafter subjecting the agglomerates in the same liquid medium to light dispersing action in the presence of finely divided sand or silica.

2. The process of claim 1 wherein the high impact milling is accomplished by means of a ball mill containing steel balls 3/16 to 2 inches in diameter.

3. The process of claim 1 wherein the finely divided comminuting agent is 20–30 mesh sand or silica.

4. The process of claim 1 wherein the nitrocellulose slurrying medium is water.

5. The process of claim 1 wherein the nitrocellulose slurrying medium is an organic nonsolvent for nitrocellulose chosen from the group consisting of aliphatic alcohols, aliphatic hydrocarbons, aromatic hydrocarbons and petroleum fractions.

References Cited by the Examiner

UNITED STATES PATENTS

| | | | |
|---|---|---|---|
| 1,361,205 | 12/1920 | Van Zandt | 241—29 |
| 1,807,383 | 5/1931 | Carnahan | 241—28 X |
| 1,961,229 | 6/1934 | Ladrette | 134—79 |
| 2,313,010 | 3/1943 | Brudal | 241—21 X |
| 2,361,059 | 10/1944 | Robertson | 241—30 X |

ROBERT C. RIORDON, *Primary Examiner.*

H. F. PEPPER, *Assistant Examiner.*